United States Patent

[11] 3,565,033

| [72] | Inventor | Robert J. Helle<br>33 Holly Drive, Crystal Lake, Ill. 60014 |
|---|---|---|
| [21] | Appl. No. | 885,681 |
| [22] | Filed | Dec. 17, 1969 |
| [45] | Patented | Feb. 23, 1971 |

[54] REARVIEW MIRROR WITH ADJUSTMENT GUIDES
10 Claims, 5 Drawing Figs.

[52] U.S. Cl..................................................... 116/124,
116/28, 248/481
[51] Int. Cl..................................................... G09f 9/00
[50] Field of Search............................................ 116/114,
28, 124; 248/481, 483; 74/(Inquired);
240/(Inquired); 350/113, 307

[56] References Cited
UNITED STATES PATENTS

| 2,685,859 | 8/1954 | Donnell........................ | 116/124 |
| 3,348,425 | 10/1967 | VanHoorp.................... | 248/483X |
| 3,439,646 | 4/1969 | Helle............................. | 116/124 |
| 3,474,998 | 10/1969 | Talbot........................... | 248/483 |
| 3,347,513 | 10/1967 | Ziedel........................... | 248/483X |

Primary Examiner—Louis I. Capozi
Attorney—Hill, Sherman, Meroni, Gross & Simpson ABSTRACT: A rearview mirror assembly comprises a mirror connected by universal joint means to a housing having an annular open ended portion in clearance relation about the perimeter of the mirror and within which the mirror is adjustable with respect to reference marks on the radially inwardly facing wall of said annular portion. There may also be clocklike index marks on an axially facing edge of said housing portion about said opening.

PATENTED FEB 23 1971
3,565,033
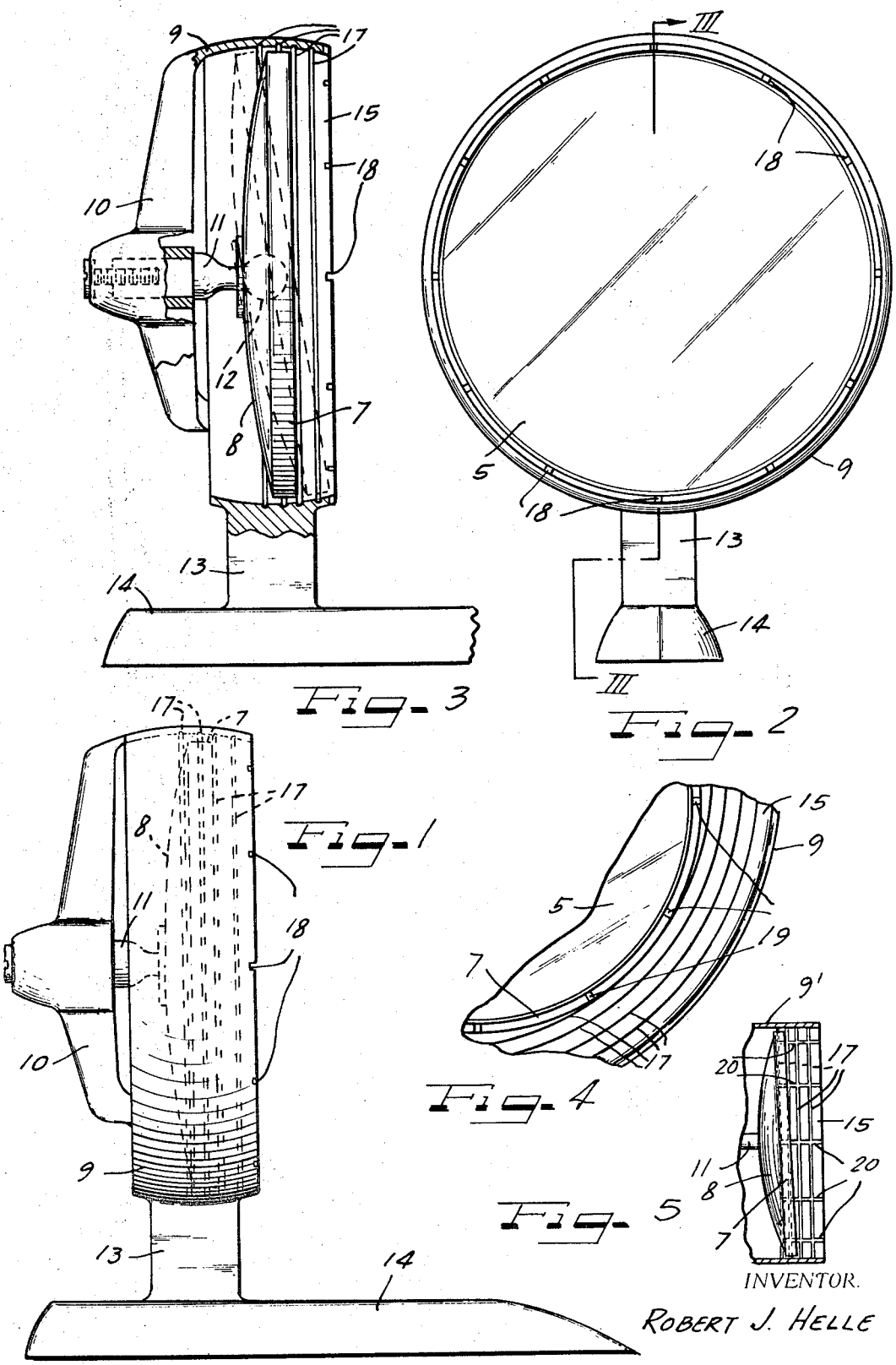
INVENTOR.
ROBERT J. HELLE
BY [signature] ATTORNEYS

REARVIEW MIRROR WITH ADJUSTMENT GUIDES

This invention relates to new and improved rearview mirror arrangement with adjustment guide means such that preferred adjustments can be readily duplicated for individual driver preferences. Generally each driver of a vehicle has his own preferred adjustment for the rearview mirror and more particularly the mirror which is mounted outside of the driver's compartment or enclosure of the vehicle. Where the mirror assembly does not have means operable from the inside of the vehicle for effecting adjustments, it is often quite inconvenient for a driver to effect readjustment after someone else has made an adjustment for himself, the mirror is pushed out of adjustment during washing or cleaning, and the like.

In my U.S. Pat. No. 3,439,646, issued Apr. 22, 1969, I have disclosed certain forms of rearview mirror assemblies in which the perimeter of the mirror rim is visible outwardly beyond the edge of the housing shell. In those instances, the mirror rim perimeter is adapted to be provided with reference or guide or index marks to be referenced to complementary marks on the housing itself for visually determining optimum adjustment and facilitating readjustment. However, where the rim perimeter is not visually accessible, either by projecting out from the housing or by having the surrounding portion of the housing transparent, markings on the mirror rim perimeter are not usable.

It is therefore an important object of the present invention to provide new and improved rearview mirror adjustment guide means enabling substantially accurate repositioning or duplication readjustment of the mirror to a preferred adjustment even though the mirror rim perimeter is visually inaccessible within a surrounding protective housing.

Another object of the invention is to provide new and improved adjustment guiding means on a housing structure within which a rearview mirror is inset.

A further object of the invention is to provide new and improved adjustment guiding means for rearview mirrors wherein a wall of a housing about the perimeter of a rearview mirror is provided with novel reference mark arrangement.

Still another object of the invention is to provide new and improved reference mark means on a rearview mirror housing having the mirror inset within an opening of the housing.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a side elevational view of a rearview mirror embodying features of the invention;

FIG. 2 is a front elevational view of the mirror;

FIG. 3 is a vertical sectional elevational view taken substantially on the line III–III of FIG. 2;

FIG. 4 shows a modification; and

FIG. 5 shows another modification.

A rearview mirror assembly embodying features of the invention comprises a mirror 5 (FIGS. 1—3) which may be circular and provided with a rim 7 and a back 8 adapted for connection to a supporting structure. In the illustrated instance, the supporting structure includes an annular housing portion 9 encompassing the mirror rim 7 and having across one end a mirror-supporting spider carrying an axial inwardly projecting mounting pin 11 having a universal joint ball end 12 on which the mirror back 8 is mounted for universal pivotal adjustment of the mirror within the housing portion 9. A pedestal 13 carries the housing portion 9 and has a base 14 by which the assembly is adapted to be secured in place on a vehicle in proper position to be within the line of vision of a vehicle operator and for whom the mirror 5 must be properly adjusted so that he can look into the face of the mirror exposed through an end opening in the housing portion 9 and with the mirror properly adjusted to provide the driver with the desired rear view.

Inasmuch as in the style of rearview mirror illustrated the mirror 5 is substantially inset relative to the viewing opening in the protective housing portion 9, means are provided according to the present invention for automatically affording a visual guide or indication of the adjusted position of the mirror wherein it best satisfies any particular driver of the vehicle, so that the adjustment may be duplicated quickly by repositioning the mirror after it has been, for any reason, moved out of the satisfactory position of adjustment for that driver. To this end, the housing portion 9 is provided on its radially inwardly facing wall 15 with desirable reference marks with which the rim 7 and more particularly its forward edge will be oriented in any preferred duplicable adjustment of the mirror within the housing. In one desirable form, the reference marks comprise annular narrow, equally axially spaced stripes 17 which may be applied in some contrasting color, and which are shown as being in the form of shallow grooves in the wall surface 15 and which may be supplied with one or more contrasting colors, respectively, so as to be readily distinguishable one from the other, and at least so as to be distinguishable quickly relative to the wall surface 15. As shown in an adjusted position of the mirror in dash line in FIG. 3 as contrasted to the neutral or concentric full line position, at least one point on the front edge of the mirror rim will be oriented in a front to rear direction with one of the reference marks 17. By observing that particular orientation after a satisfactory adjustment has been found for the mirror, the same adjustment can be repeated by again moving the mirror into the same reference mark orientation.

In order to attain as close relationship of the mirror edge to the housing surface 15 as practicable in every position of relative adjustment, at least the housing surface 15 is desirably of a generally semispherical form with the radius at the center of radius of universal pivotal adjustment of the mirror. Thereby any point of reference of the mirror front edge with respect to any of the reference marks 17 will be substantially equally efficiently attained, having regard to visual perception because of the substantially uniform spacing at any point of adjustment along the surface 15, especially when considered a front to rear direction.

In order further to assist in enabling rapid duplication of tilted adjustment positions of the mirror, index marks 18 are desirably provided at circumferentially spaced points relative to the circular reference marks 17. In one desirable form, the circumferential marks may comprise notches 18 in the edge of the housing portion 9 about the mirror-viewing opening. For example, there may be 12 of the marks 18 positioned at clock hour intervals, as shown in FIGS. 1—3.

In another form as shown in FIG. 4, the index marks may comprise clock-spaced peripheral marks 19 on the front edge of the mirror rim 7.

In still another form, as shown in FIG. 5, the index marks may comprise axially extending clock-spaced front to rear stripelike marks 20 on the surface 15 in intersecting relation to the annular reference marks 17.

In each respective form of the index marks 18, 19 and 20, the index marks will assist in ready identification of the point on the mirror edge which is to be oriented with respect to the reference marks 17 to attain the desired readjustment of the mirror.

I claim:

1. In a rearview mirror assembly including a mirror having a rim and a back having a universal joint connection with a supporting structure comprising a housing having an annular portion encompassing said mirror rim and within which the face of the mirror is inset relative to an edge of the housing about a mirror-viewing opening thereinto, the improvement comprising: reference marks on a radially inwardly facing surface of the housing portion about said mirror rim and with which selected points on the mirror rim visible edge are adapted to be oriented to attain predetermined adjustments of the mirror relative to the housing.

2. In a mirror assembly according to claim 1, said reference marks being in the form of a plurality of narrow annular stripes on said surface spaced from one another in the axial direction of said surface.

3. In a rearview mirror assembly according to claim 2, said stripes comprising shallow grooves in said surface.

4. In a rearview mirror assembly according to claim 3, said housing having circumferentially spaced index marks thereon related to said reference marks to facilitate orientation of the selected points on the mirror rim edge with the reference marks.

5. In a rearview mirror assembly according to claim 1, said surface being semispherical on a radius at the center of radius of swinging movement of said mirror on said universal joint whereby to maintain a substantially uniform closely spaced relation between said surface and said mirror rim and edge in all adjusted relations of the edge relative to said reference marks.

6. In a rearview mirror assembly according to claim 1, said housing portion having an axially facing edge about said opening, and index marks on said edge to facilitate orientation of the selected points on the mirror edge with the reference marks.

7. In a rearview mirror assembly according to claim 1, said mirror edge having a circumferentially spaced series of index marks thereon to facilitate orientation of any selected point on said edge with said reference marks.

8. In a rearview mirror assembly according to claim 1, a circumferentially spaced series of index marks on said housing portion surface related to said reference marks to facilitate duplication of adjustments of the mirror relative to said reference marks.

9. In a rearview mirror assembly according to claim 8, said reference marks comprising ring-shaped stripes, and said index marks comprising longitudinally elongated stripes intersecting said ring-shaped stripes.

10. In a rearview mirror assembly according to claim 1, one of said annular housing portion and said mirror edge having a clock-spaced series of index marks cooperative with said reference marks to facilitate duplicating adjustments of said mirror relative to said housing portion.